United States Patent [19]

Ambler et al.

[11] Patent Number: 4,481,329
[45] Date of Patent: Nov. 6, 1984

[54] METHOD OF DISPERSING REINFORCING PIGMENTS IN A LATEX

[75] Inventors: Michael R. Ambler, Stow; Gary L. Burroway, Doylestown, both of Ohio

[73] Assignee: The Goodyear Tire & Rubber Company, Akron, Ohio

[21] Appl. No.: 544,304

[22] Filed: Oct. 21, 1983

[51] Int. Cl.³ .............................................. C08J 3/02
[52] U.S. Cl. .................................. 524/501; 524/424; 524/522
[58] Field of Search ................................. 524/522, 501

[56] References Cited

U.S. PATENT DOCUMENTS 2,656,324 10/1953 Grotenhuis ........................ 524/522
3,694,394 9/1972 Freeman .............................. 524/522

FOREIGN PATENT DOCUMENTS 1182253 2/1970 United Kingdom ................ 524/522
857173 8/1981 U.S.S.R. .............................. 524/522

Primary Examiner—Joseph L. Schofer
Assistant Examiner—N. Sarofim
Attorney, Agent, or Firm—D. O. Nickey

[57] ABSTRACT

There is disclosed a process for blending rubber latices with carbon black or other reinforcing pigments which comprises the use of a 60/40 to 40/60 butadiene/methacrylic acid latex which has been converted to a water soluble polymer through treatment with an alkali metal hydroxide. Said converted butadiene/methacrylic acid latex is then combined with dry carbon black at a level of 1 to 2 percent butadiene/methacrylic acid dispersing latex solids based on weight of the carbon black. The blended carbon black butadiene/methacrylic acid dispersion is added to rubber latices prior to coagulation. More specifically, this invention is concerned with a carbon black dispersion and its addition to a rubber latex.

8 Claims, 1 Drawing Figure

J/L CENTRIFUGE CHARTS

METHOD OF DISPERSING REINFORCING PIGMENTS IN A LATEX

TECHNICAL FIELD

This invention relates to a process for blending latex rubber and carbon black or other reinforcing pigments. The process of the present invention provides a rubber latex having uniformly dispersed therein a reinforcing agent.

BACKGROUND ART

Carbon black is widely used as a reinforcing agent in rubber. Conventionally, carbon black or like reinforcing pigments, such as silica, have been incorporated into rubbery polymers by vigorous high shear milling in a suitable mixer. However, during commercial mixing operations of this type the carbon black tends to agglomerate in the rubber thereby producing large clumps of pigment and an unsatisfactory degree of pigment dispersion.

Recently processes of the type wherein the carbon black is dispersed in the latex form of the rubber have found wide use in the rubber industry and have overcome many of the disadvantages of conventional dry mixing.

U.S. Pat. No. 3,317,458 discloses a process for the production of a vulcanizable elastomer wherein carbon black and a light reinforcing filler, i.e. silicon dioxide, are added to the latex of the elastomer. The carbon black and light filler components are mixed with said latex in the form of an aqueous suspension.

U.S. Pat. No. 3,298,984 is concerned with a method of reinforcing a rubber in its latex form which comprises preblending the reinforcing agent with the carrier and then blending the preblend of carrier and reinforcing agent with the rubber latex to thereby produce a reinforced rubber latex. The carrier or dispersing agent is a water soluble phenolic resin, particularly the condensates resulting from the reaction of an aldehyde with a phenol are desirable carriers or dispersing agents in bringing about the intimate association of the reinforcing agent with the rubber particles of the latex. Specific carriers or dispersing agents such as the condensates resulting from the reaction of formaldehyde and a polyhydric phenol such as resorcinol are disclosed.

United Kingdom Pat. No. 1,125,801 relates to the production of a carbon black masterbatch of natural rubber formed by the mixing of carbon black with rubber in latex form followed by the simultaneous coagulation together of rubber and carbon black. The carbon black is stirred into water containing a dispersing agent. Dispersing agents, such as the sodium salt of methylene dinaphthalene sulfonic acid sold under the trademark of "Dispersol LN" and a sodium salt of the sulphonation product of lignin which is sold under the Trade Name of Marasperse CB are disclosed.

U.S. Pat. No. 3,021,226 discloses a method for preparing carbon black slurries using a rosin acid soap as the dispersing agent which comprises mixing the carbon black with water in the presence of at least 5 parts by weight of a rosin acid soap and at least 0.2 parts by weight of an alkali metal or ammonium hydroxide per 100 parts of carbon black.

U.S. Pat. No. 3,023,188 discloses carbon black slurries prepared by dispersing carbon black in alcohol and a minor amount of an alkali metal hydroxide.

U.S. Pat. No. 2,794,749 discloses a method for dispersing furnace carbon blacks in aqueous medium with the aid of a dispersing composition comprising a tannic acid product, a lignin material selected from the group consisting of lignin and sulfonated derivatives thereof and an alkaline material selected from the group consisting of alkali metal and ammonium hydroxides.

U.S. Pat. No. 4,098,715 discloses a process for blending liquid rubber, i.e. cements with carbon black. The invention describes a process for blending liquid rubber in carbon black with a high torque mixer. The liquid rubber (rubber dissolved by an organic solvent) is mixed with a relatively large amount of carbon black to prepare a preliminary dispersion having a relatively high uniformity which is then diluted with liquid rubber to give a composition having a desired carbon black content. This is conducted using mixers normally used for viscous liquids such as Banbury mixers or mills.

None of the references describe or suggest the use of a low molecular weight (500–30,000) butadiene/methacrylic acid polymer as a dispersing agent for the incorporation of carbon black in a rubber latex. The process of the present invention provides for blending of latex rubber or rubber in the latex form with carbon black so as to prepare a composition in which the carbon black is uniformly dispersed in the latex without the use of high torque mixers. Further, the art does not suggest the superior dispersions that can be obtained through the process of the present invention. High shear mixing of the rubber is not required to obtain pigment dispersions and the present process can be used for carbon black, silica pigments and other fillers or pigments. In addition, the prior art methods which utilize dispersing agents generally result in a loss in physical properties of the final rubber product. The present invention allows for higher solids black dispersions of excellent stability to be prepared which do not require high shear mixing and do not diminish the final rubber properties.

It is the applicant's unsupported belief that the process of the present invention provides excellent final vulcanizate properties due to the ability of the butadiene portion of the dispersing polymer to enter into the curing reaction.

DISCLOSURE OF THE INVENTION

There is disclosed a process for blending latex rubber and a reinforcing agent by stirring and dispersing a mixture of the reinforcing agent in the rubber latex, the improvement comprising initially contacting the reinforcing agent with a 60/40 to 40/60 butadiene/methacrylic acid dispersing latex which has been converted to a water soluble form through treatment with an alkali metal hydroxide at a ratio of dry reinforcing agent to dispersing latex solids in the range of from 90:10 to 90:1.

Also disclosed is a method of preparing a reinforcing agent-pigment rubber latex mixture which comprises initially contacting the reinforcing agent-pigment with a butadiene/methacrylic acid dispersing latex which has been converted to a water soluble form through treatment with an alkali metal hydroxide at a ratio of dry reinforcing agent-pigment to latex solids in the range of from 90:10 to 99:1, thereafter adding the reinforcing agent-pigment butadiene/methacrylic acid mixture to a rubber latex to be reinforced in conventional amounts under conventional conditions.

BRIEF DESCRIPTION OF THE DRAWINGS

The accompanying drawings, FIG. 1, portrays a graph showing the variation of absorbance of various samples (A-E) as a function of time using a Joyce-Loebl disc centrifuge. The speed at which particles settle (time) is related to particle size and the slope of the curve is related to concentration.

BEST MODE FOR CARRYING OUT THE INVENTION

Figure 1:
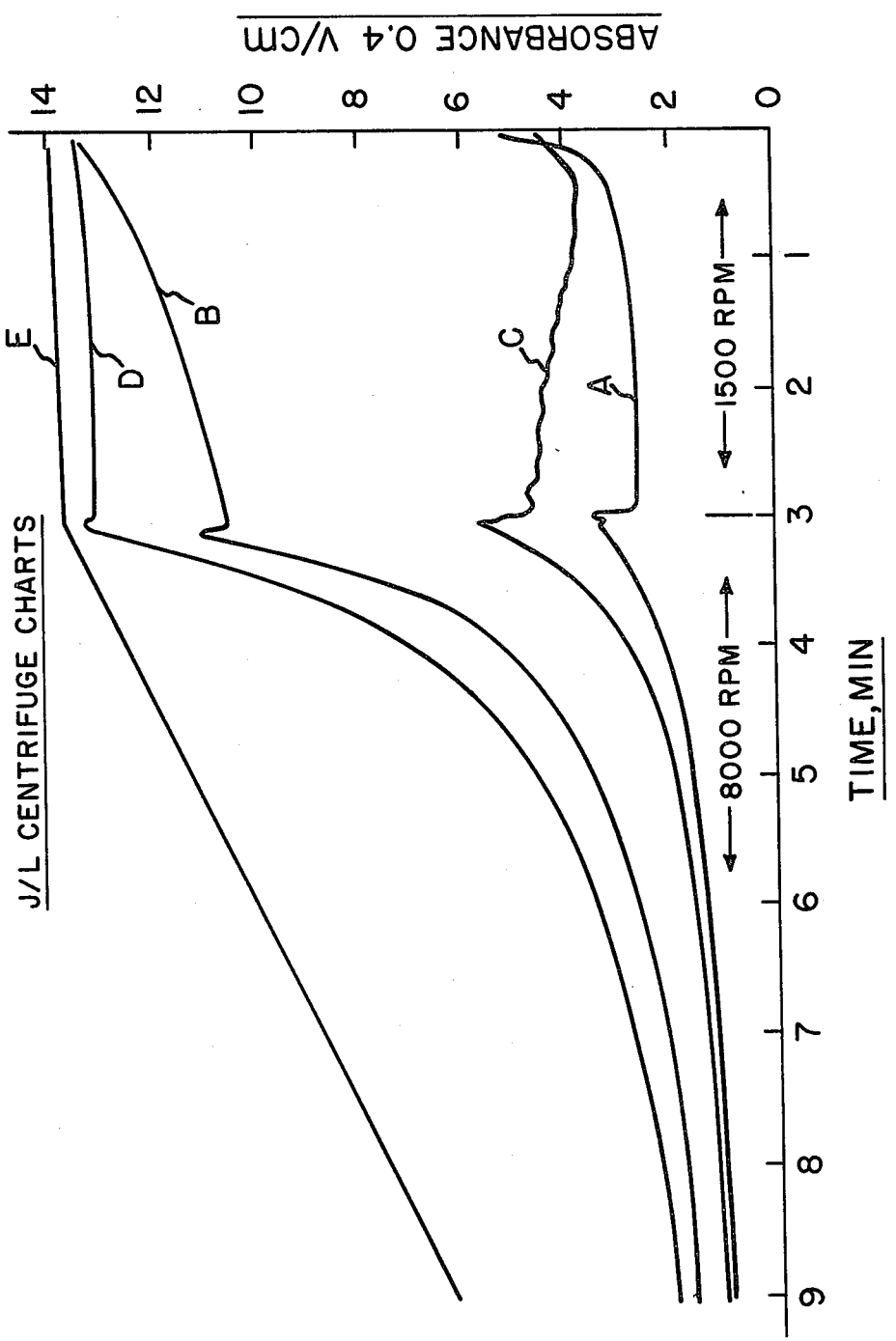

In the present process 90 to 99 parts by weight of reinforcing agent-pigment, i.e. carbon black are mixed with 10 to 1 parts solids weight of a 60/40 to 40/60 butadiene/methacrylic acid latex which has been converted to the water soluble form through treatment with an alkali metal hydroxide. The mixture is stirred to prepare a reinforcing agent-pigment dispersion which is then added to a rubber latex, e.g. a styrene butadiene aqueous polymerization reaction mixture. The reinforcing agent-pigment/dispersing polymer is then added to a rubber latex to a predetermined concentration of reinforcing agent-pigment thereafter the final composition of reinforcing agent-pigment and latex rubber is coagulated to provide a polymer that has uniformly dispersed therein the reinforcing agent-pigment.

The dispersing latex in the process of the present invention is preferably a butadiene/methacrylic acid polymer or resin. This polymer has a low molecular weight such as from 500 to 30,000. Butadiene is the preferred conjugated diene monomer in the dispersing latex, however, other monomers such as isoprene, chloroprene, and pentadiene can be used. Carboxylic monomers other than methacrylic acid such as acrylic acid, itaconic acid, fumaric, crotonic and maleic acids can also be used. The conjugated diene/carboxylic monomers are polymerized using known emulsion polymerization techniques.

The low molecular weight conjugated diene/carboxylic acid polymer has a terminal functional group as a result of the polymerization and can be effectively used in the process of the present invention through treatment with an alkali metal hydroxide to convert the acid polymer to its water soluble form.

The reinforcing carbon black fillers suitable for use in the present process include those blacks such as: SAF (Super Abrasion Furnace Blacks), ISAF (Intermediate Super Abrasion Furnace Blacks), HAF (High Abrasion Furnace Blacks), FEF (Fast Extrusion Furnace Blacks), GPF (General Purpose Furnace Blacks), and FT (Fine Thermal Blacks).

The forms of the carbon black used may vary and include powders, pellets, and soft and hard beads. The process of the present invention is especially effective when powders are used. Commercial carbon blacks usually contain 0.5 to 2 weight percent water.

The amount of dispersing latex solids (butadiene/methacrylic acid latex) used can vary with the nature of the carbon black but the amount is ordinarily from 1 to 10 percent based on the weight of the carbon black, more preferably from 1-3%. The combination of the carbon black with the dispersing latex can be accomplished with any known mixing tecnique. Preferably a high shear mixer is used.

The carbon black with dispersing latex is then added to the rubber latex. The carbon black/dispersing latex and the rubber latex are then simultaneously coagulated together to form the reinforced rubber.

The present invention provides a method for reinforcing rubber using a specialized dispersing latex which permits for the first time the true reinforcement of a rubber in latex form without the necessity of breaking down the molecular weight of the rubber on a mill.

The rubber invention preserves the molecular weight of the rubber being reinforced since the reinforcement thereof occurs in the latex form and thus makes possible for the vulcanization of the reinforced rubber at a molecular weight level that has heretofore been imposible when working in the dry state. Ordinarily, dry rubber is broken down on a mill to incorporate reinforcing agent from, for example, a molecular weight from about 400,000 to about 250,000 (as determined by inherent viscosity measurements) and is then cured. The 250,000 molecular weight rubber will have properties inferior to a 400,000 molecular weight rubber cured in the same manner. In the present invention the reinforced rubber recovered from the latex will have, for example, an undisturbed molecular weight of 400,000 which can then be cured to produce a rubber having properties superior in regard to tensile, elongation, etc. to the properties of the same rubber if the rubber were broken down on a mill during mixing with carbon black and then cured. It is also believed that the dispersing latex of the present invention enters into the vulcanization reaction and thus provides a second reason for the superior properties of the instant invention.

An important use for the reinforced latex is in, for example, building up a tread for a tire on a pneumatic tire carcass of fabric plies by rotating the fabric carcass in the reinforced rubber latex which has been thickened to the desired degree and then drying each layer of the latex as it is deposited thereon until the desired thickness of tread is produced. Another important use of the reinforced latex of this invention is in the manufacture of cord rubber adhesives wherein the reinforced rubber latex is compounded with conventional ingredients to produce an adhesive having exceptional ability to securely bond tire cord to rubber in the construction of a pneumatic tire.

Any rubber initially in a latex form may be reinforced in accordance with the process of this invention. Such rubbers include natural rubber and any of the known synthetic emulsion rubbers, particularly the diene rubbers and especially the conjugated diene hydrocarbon rubbers that are well-known in the synthetic rubber art. The process of this invention is also suitable for the incorporation of reinforcing agent-pigments to a synthetically prepared emulsion of, e.g. butyl rubber or solution SBR. Further, the process of this invention is also suitable for the dispersion of ingredients in plastics, as in the dispersion of carbon black in toner resin for copiers.

Having generally described this invention a further understanding can be obtained by reference to the examples which are provided herein for purposes of illustration and are not intended to be limiting unless otherwise specified.

EXPERIMENTAL

Carbon black slurries were prepared with and without polymeric dispersants of the present invention. These slurries were added to an oil extended SBR 1712 rubber latex and the blend was coagulated to give a black masterbatch rubber. The masterbatch samples were compounded into a conventional tread stock and evaluated with a control compound.

The preferred polymeric dispersants are prepared from butadiene and methacrylic acid monomers using known emulsion polymerization techniques. The latex is diluted to 1 percent solids by weight and the pH is adjusted to 9 to 9.5 with sodium hydroxide. Carbon black slurries are prepared by grinding the black in water or in water containing the dispersant in a Waring Blender for 5 minutes at high speed.

EXAMPLE 1

The carbon black slurries with or without the present invention were evaluated for stability using the Joyce-Loebl Disc Centrifuge (hereinafter J/L). Further information of the Joyce-Loebl Disc Centrifuge can be obtained from an article by Provder and Holsworth, *Particle Size Distribution Analysis by Disc Centrifuge Photosedimentometry;* ACS Organic Coatings & Plastics Chemistry, Preprints, (36) 2, pp. 150–156 (1976). The J/L curve is shown in FIG. 1. Sample A is a normal carbon black/water dispersion. The right side of the curve was run at 1500 rpm and the materials which settle out in this region are large particles and agglomerates which are unstable. The left side of the curve represents an 8000 rpm centrifuge speed where all the remaining smaller particles settle out. The speed at which particles settle (time) is related to the particle size, the slope is related to its concentration. The particles of Sample A settle out almost immediately at 1500 rpm, therefore, they are all very large and unstable. Sample D (5% by weight budadiene/methacrylic acid dispersant solids per dry carbon black) is almost a flat line at 1500 rpm so the particles are all small and the dispersion is quite stable. Sample E represents a carbon black sample which has been reduced to its ultimate structure by ultrasonic dispersion in a Marasperse solution. On a commercial scale, preparation of such an ultimate dispersion is not practical or economical. Sample E settles at about the same rate as Sample D at 1500 rpms. Sample B is the same material as Sample D but the dispersant level is one-half that of D (2.5% of the black content vs 5%). Sample C contained 0.01% by weight of a high efficiency fluorocarbon surfactant. Analysis of numerous carbon black slurries using the J/L method revealed that using butadiene/methacrylic acid dispersants with methacrylic acid levels of 60% and 2 parts per hundred of budadiene/methacrylic acid solids per dry carbon black gave the most stable dispersion.

EXAMPLE 2

Carbon black slurries were combined with a laboratory prepared emulsion type rubber latex and an aromatic extending oil using the techniques developed for laboratory preparation of oil extended rubber. The three component mixture of carbon black, latex and oil separates within seconds if the agitation is stopped when prepared in the usual manner. When the polymeric dispersant of the present invention was used at a level of 2.5% solids on the black, the mixture did not separate for several days. Mixtures of latex and black without the oil are more stable but separation occurs within an hour. With the polymeric dispersant of the present invention no separation occurs for several days. During coagulation the mixtures containing the polymeric dispersant of the present invention coagulated as a uniform small particle crumb while the customary mixtures produced a black, gray crumb containing a considerable amount of free black. After drying there is a considerable amount of uncombined carbon black in the customary masterbatch which rubs off when the sample is touched. The sample containing dispersant of the instant invention was clean to the touch; no carbon black rubbed off.

Cure ingredients were milled into all the samples. Compounds were cured and compared to a normal Banbury mixed compound. The results in Table I show that there was some loss of carbon black in Sample A, the material without polymeric dispersant, as indicated by specific gravity. The modulus is low with this sample also. Abrasion results indicate the Pico abrasion is poor for Compound 1 and is slightly improved by the use of the dispersant of the present invention; Compound 2.

The present invention allows for solids content of the black slurry to be raised to 10–15% solids while still maintaining low viscosities. The use of the polymeric dispersant of the present invention results in latex/carbon black/oil mixtures which are stable for several days. Only a slight separation of oil occurred after 3 days. Mixtures without the dispersant of the present invention separated in several seconds. Coagulated product made with the polymeric dispersant of the present invention is more homogeneous than that made without dispersant. Considerable amounts of free black are present when no dispersant is used. Most important of all, the compound properties of the final product are not adversely affected by the dispersant of the present invention.

TABLE I

| TREAD COMPOUNDS | | |
|---|---|---|
| | Compound | |
| Ingredients | 1 | 2 |
| Sample A-Control | 206.00 | 0.0 |
| Sample B | 0.0 | 206.00 |
| ZnO$_2$ | 3.00 | 3.00 |
| Stearic Acid | 1.35 | 1.35 |
| Sulfur | 1.75 | 1.75 |
| Accelerator | 1.40 | 1.40 |
| | 213.50 | 213.50 |
| Rheometer, 300F, 3 Deg. Arc. 100CPM, 60 min. Motor | | |
| Torque, Min. | 12.0 | 14.0 |
| Torque, Max. | 48.9 | 54.0 |
| TS 2 | 16.3 | 13.4 |
| T'C90 | 36.5 | 33.0 |
| T'C95 | 43.0 | 40.5 |
| Autographic Tensile | | |
| Tensile, PSI | 3300. | 2725. |
| Elongation, % | 745. | 610. |
| 300% Modulus | 825. | 1050. |
| Hardness, Shore A | 61. | 66. |
| Best Cure, Min. @ 300 F | 40. | 40. |
| Specific Gravity | 1.140 | 1.154 |
| Pico Abrasion Index | 86. | 94. |
| Mixed | mill | mill |
| Dispersant | no | yes |

EXAMPLE 3

Reinforcing agents-pigments other than carbon black are commercially available and useful in the present invention. Hi Sil 233 (a commercially available reinforcing agent-pigment from PPG Industries) was utilized in place of carbon black. 320 grams of Hi Sil 233 was added to 1940 grams of water which contained 16 grams of dry solids of a 40:60 butadiene/methacrylic acid polymer which was prepared using accepted emulsion polymerization techniques. The butadiene/methacrylic acid polymeric dispersant was pre-neutralized to a pH of 10.0 with KOH. The slurry was agitated at high speeds in a blender for 5 minutes.

The resultant slurry was used to reinforced an SBR 1712 latex. 875 grams of SBR 1712 latex at 20% solids by weight, 132 grams of aromatic processing oil and 1055 grams of the slurry (14.5% solids by weight) prepared above were mixed and then coagulated by pouring into a water solution containing 3000 ml water, 125 gms. NaCl and $H_2SO_4$ to obtain a pH of 5–5.5. The reinforced rubber was filtered, washed with cold water and dried for 5 hours at 90° C. to obtain a powdered, reinforced, rubber product.

EXAMPLE 4

Additional experiments were conducted wherein Controls I and II (without dispersant of instant invention) were compared with Samples A–D (different levels of dispersant and different methacrylic acid/butadiene ratios) of the invention. The procedure as described in Example 2 was followed. Table II lists the components of the controls and the samples and the physical properties of the resulting rubbers.

TABLE II

| Components Parts by Weight | Control I | Control II | Sample A | Sample B | Sample C | Sample D |
|---|---|---|---|---|---|---|
| SBR-1712 + 37 parts dry carbon black milled in | 137.50 | — | — | — | — | — |
| SBR-1712 + carbon black/water dispersion | — | 137.50 | — | — | — | — |
| SBR-1712 + 2.5 parts of 60/40 MA/Bd. dispersant/carbon black | — | — | 137.50 | — | — | — |
| SBR-1712 + 5.0 parts of 60/40 MA/Bd dispersant and carbon black | — | — | — | 137.50 | — | — |
| SBR-1712 + 2.5 parts 50/50 MA/Bd dispersant and carbon black | — | — | — | — | 137.50 | — |
| SBR-1712 + 5.0 parts 50/50 MA/Bd dispersant and carbon black | — | — | — | — | — | 137.50 |
| ZnO | 3.00 | 3.00 | 3.00 | 3.00 | 3.00 | 3.00 |
| Stearic Acid | 1.35 | 1.35 | 1.35 | 1.35 | 1.35 | 1.35 |
| Sulfur | 1.75 | 1.75 | 1.75 | 1.75 | 1.75 | 1.75 |
| Accelerator | 1.40 | 1.40 | 1.40 | 1.40 | 1.40 | 1.40 |
| Rheometer, 300 F, 3 Deg. ARC, 100 CPM, 60 MIN. MOTOR | | | | | | |
| Torque, min. | 12.7 | 14.2 | 14.2 | 11.0 | 13.6 | 17.9 |
| Torque, max. | 56.8 | 57.4 | 57.7 | 54.2 | 54.9 | 63.1 |
| TS 2 | 12.0 | 12.7 | 12.6 | 13.8 | 12.2 | 10.8 |
| T'C90 | 33.6 | 35.0 | 34.9 | 35.9 | 36.8 | 35.3 |
| T'C95 | 41.0 | 42.0 | 42.0 | 43.0 | 43.7 | 43.9 |
| ML-4 MIN./212F | 59. | 62. | 64. | 52. | 62. | 79. |
| GARVEY DIE EXTRUSION | | | | | | |
| Inches/min. | 19. | 19. | 19. | 20. | 19. | 20. |
| Grams/min. | 256. | 278. | 281. | 263. | 254. | 300. |
| Grams/inch | 13.48 | 14.78 | 14.56 | 13.26 | 13.41 | 14.75 |
| AUTOGRAPHIC TENSILE | | | | | | |
| Tensile, psi | 2900. | 3200. | 3050. | 2825. | 3100. | 3275. |
| Elongation, % | 600. | 620. | 610. | 620. | 660. | 570. |
| 300% modulus | 1150. | 1250. | 1175. | 1150. | 1100. | 1400. |
| Hardness, Shore A | 63. | 65. | 66. | 68. | 66. | 66. |
| Best Cure, Min. at 300 F | 40. | 40. | 40. | 40. | 40. | 40. |
| Specific gravity | 1.154 | 1.157 | 1.160 | 1.160 | 1.161 | 1.158 |
| Tear, Die (c) ppi | 270. | 273. | 271. | 280. | 262. | 293. |
| Compression Set (b), % 22 hrs./158F | 14.3 | 16.4 | 17.8 | 20.5 | 14.7 | 12.3 |
| Pico abrasion Index | 93. | 101. | 98. | 102. | 95. | 100. |
| Goodyear-Healey Rebound & Deflection | | | | | | |
| Cold rebound, % | 49.6 | 49.1 | 47.7 | 45.9 | 45.0 | 49.6 |
| Deflection, in. | .232 | .225 | .219 | .215 | .222 | .222 |
| Hot rebound, % | 67.3 | 67.9 | 67.3 | 63.5 | 66.2 | 70.1 |
| Deflection, in. | .284 | .281 | .278 | .277 | .286 | .275 |
| Dynamic Modulus, 212F | | | | | | |
| E | 62.3 | 67.8 | 66.5 | 68.9 | 63.9 | 70.6 |
| N | 27.7 | 31.7 | 31.2 | 37.4 | 31.7 | 29.1 |
| R | 34.0 | 32.6 | 31.9 | 27.0 | 30.0 | 36.6 |
| H(X) | 105.7 | 117.4 | 116.4 | 129.2 | 114.8 | 115.0 |
| H(F) | 121.9 | 114.3 | 117.7 | 121.9 | 126.2 | 103.4 |
| Goodyear 66% Flex at Room Temperature | | | | | | |
| Min. to fail | 240. | 240. | 240. | 240. | 240. | 240. |

TABLE II-continued

| Components Parts by Weight | Control I | Control II | Sample A | Sample B | Sample C | Sample D |
| --- | --- | --- | --- | --- | --- | --- |
| Min. to fail | 240. | 240. | 240. | 240. | 240. | 240. |
| Min. to fail | 240. | 240. | 240. | 240. | 240. | 240. |
| Min. to fail | 180. | 240. | 240. | 240. | 240. | 240. |
| Average | 225.0 | 240.0 | 240.0 | 240.0 | 240.0 | 240.0 |
| No. fail | 3. | 4. | 4. | 4. | 4. | 4. |
| Air Bomb Aging - 16 Hrs./236F/80 psi | | | | | | |
| Tensile, psi | 2475. | 2500. | 2550. | 2400. | 2600. | 2600. |
| % retained | 85. | 78. | 84. | 85. | 84. | 79. |
| Elongation, % | 425. | 420. | 430. | 425. | 480. | 420. |
| % retained | 71. | 68. | 70. | 69. | 73. | 74. |
| Hardness, Shore A | 72. | 73. | 73. | 76. | 74. | 74. |
| Point change | 9. | 8. | 7. | 8. | 8. | 8. |

INDUSTRIAL APPLICABILITY

The artisan will appreciate that the present invention satisfies a long felt need in this technical area. Presently accepted methods for preparing black dispersions result in low solids reinforcing dispersions which do not mix well with rubber latex. Heretofore, the use of dispersing agents generally resulted in a decline in physical properties in the final rubber product. The present invention provides a method for preparing high solids content reinforcing agent dispersion of excellent stability which mix easily with latices and do not diminish final rubber product properties.

While certain representative embodiments and details have been shown for the purpose of illustrating the invention, it will be apparent to those skilled in this art that various changes and modifications may be made therein without departing from the scope of the invention.

We claim:

1. A process for blending rubber latex and a reinforcing agent by stirring and dispersing a mixture of the reinforcing agent selected from the group consisting essentially of carbon black and precipitated hydrated amorphous silicas in the rubber latex, the improvement comprising initially contacting the reinforcing agent with a 60/40 to 40/60 butadiene/methacrylic acid dispersing latex which has been converted to a water soluble form through treatment with an alkali metal hydroxide at a ratio of dry reinforcing agent to dispersing latex solids in the range of from 90:10 to 99:1.

2. A process according to claim 1 wherein the dry reinforcing agent is carbon black.

3. A process according to claim 1 wherein the dry reinforcing agent is carbon black and the ratio of dry carbon black to dispersing latex solids is from 95:5 to 98:2.

4. A process according to claim 1 wherein the ratio of butadiene to methacrylic acid in the dispersing latex is 50/50.

5. A process for the preparation of reinforcing agent-pigment rubber latex mixture which comprises initially contacting the reinforcing agent selected from the group consisting essentially of carbon black and precipitated hydrated amorphous silicas with a butadiene/methacrylic acid dispersing latex which has been converted to a water soluble form through treatment with an alkali metal hydroxide at a ratio of dry reinforcing agent-pigment to latex solids in the range of from 90:10 to 99:1, thereafter adding the reinforcing agent-pigment butadiene/methacrylic acid mixture to a rubber latex to be reinforced in conventional amounts under conventional conditions.

6. A process according to claim 5 wherein the dry reinforcing agent is carbon black.

7. A process according to claim 5 wherein the dry reinforcing agent is carbon black and the ratio of dry carbon black to dispersing latex solids is from 95:5 to 98:2.

8. A process according to claim 5 wherein the butadiene/methacrylic acid dispersing latex has a ratio of 50/50, butadiene to methacrylic acid and the ratio of dry reinforcing agent pigment to latex solids ranges from 95:5 to 98:2.

* * * * *